US009799916B2

(12) United States Patent
Halalay et al.

(10) Patent No.: US 9,799,916 B2
(45) Date of Patent: Oct. 24, 2017

(54) LITHIUM ION BATTERY ELECTRODES

(71) Applicant: GM GLOBAL TECHNOLOGY OPERATIONS LLC, Detroit, MI (US)

(72) Inventors: Ion C. Halalay, Grosse Pointe Park, MI (US); Timothy J. Fuller, Pittsford, NY (US); Zicheng Li, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 257 days.

(21) Appl. No.: 14/492,303

(22) Filed: Sep. 22, 2014

(65) Prior Publication Data

US 2015/0093639 A1 Apr. 2, 2015

Related U.S. Application Data

(60) Provisional application No. 61/884,619, filed on Sep. 30, 2013.

(51) Int. Cl.
| | |
|---|---|
| *H01M 10/052* | (2010.01) |
| *H01M 10/0525* | (2010.01) |
| *H01M 4/131* | (2010.01) |
| *H01M 4/136* | (2010.01) |
| *H01M 4/62* | (2006.01) |

(52) U.S. Cl.
CPC ....... *H01M 10/0525* (2013.01); *H01M 4/131* (2013.01); *H01M 4/136* (2013.01); *H01M 4/622* (2013.01); *H01M 4/625* (2013.01)

(58) Field of Classification Search
CPC .................. H01M 10/052; H01M 10/0525
See application file for complete search history.

(56) References Cited

U.S. PATENT DOCUMENTS

| 5,130,211 | A | 7/1992 | Wilkinson | |
|---|---|---|---|---|
| 5,698,339 | A * | 12/1997 | Kawakami | H01M 4/13 427/201 |
| 6,689,513 | B1 | 2/2004 | Morigaki et al. | |
| 7,022,812 | B2 | 4/2006 | Yoshimura et al. | |
| 7,282,109 | B2 | 10/2007 | Takata et al. | |
| 2010/0239900 | A1 | 9/2010 | Take et al. | |
| 2011/0117413 | A1 | 5/2011 | Wang et al. | |
| 2011/0151333 | A1* | 6/2011 | Halalay | H01M 2/1653 429/249 |

(Continued)

FOREIGN PATENT DOCUMENTS

| CN | 105609704 A | 5/2016 |
|---|---|---|
| DE | 102014113893 A1 | 4/2015 |

OTHER PUBLICATIONS

Walkowiak, et al., Macrocycle Carriers for Separation of Metal Ions in Liquid Membrane Process—A Review, Desalination 240, 1999, pp. 186-197.

(Continued)

*Primary Examiner* — Olatunji Godo
(74) *Attorney, Agent, or Firm* — Harness, Dickey & Pierce, P.L.C.

(57) ABSTRACT

A lithium ion battery includes a positive electrode and a negative electrode. In an example, a positive electrode for the lithium ion battery includes a lithium transition metal oxide-based active material and a high surface area carbon. The positive electrode further includes a reactive binder having a macrocycle bonded thereto.

11 Claims, 2 Drawing Sheets

(56) References Cited

U.S. PATENT DOCUMENTS

2011/0165459 A1* 7/2011 Halalay ............... H01M 2/1653
429/217

OTHER PUBLICATIONS

Komaba, et al., Inorganic Electrolyte Additives to Suppress the Degradation of Graphite Anodes by Dissolved Mn(II) for Lithium-Ion Batteries, Journal of Power Sources 119-121, 2003, pp. 378-382.

Shahrisa, et al., CHemistry of Pyrones, Part 3: New Podands of 4H-Pyran-4-ones; 5 Molecules, 2000, pp. 200-207.

Bruening, et al., Understanding Cation-Macrocycle Binding Selectivity in Single-Solvent Extractions, and Liquid Membrane Systems by Quantifying Thermodynamic Interations; Cation Binding by Macrocycles, Chapter 2, 1990, pp. 112-113, Marcel Dekker Inc., New York and Basel.

Kaifer, et al., Redox Control of Cation Binding in Macrocyclic Systems; Cation Binding by Macrocycles, 1990, Chapert 8, p. 364, Marcel Dekker Inc., New York and Basel.

Atwood, et al., Cation Complexation by Calizarenes; Cation Binding by Macrocycles, 1990, Chapter 15, pp. 581-582, 587; Marcel Dekker Inc., New York and Basel.

Toner, et al., Modern Aspects of Host-Guest Chemistry: Molecular Modeling and Conformationally Restricted Hosts; Crown Ethers and Analogs, 1989, Chapter 3, pp. 81-83, John Wiley and Sons, New York.

Vogtle, et al., Crown-ether-complexes and Selectivity; Crown Ethers and Analogs, 1989, Chapter 4, pp. 208-215, John Wiley and Sons, New York.

Weber, E., New Developments in Crown Ether Chemistry: Lariats, Spherands, and Second-Sphere Complexes; Crown Ethers and Analogs, 1989, Chapter 5, pp. 306-307, 309, 314-315, 320-321, John Wiley and Sons, New York.

Arora, et al., Battery Separators, Chem. Rev. 104, 2004, pp. 4419-4462.

"Teijin Develops More Heat-Resistant Li-Ion Battery Separator", Trading Markets.Com, Sep. 10, 2009, 3 pages, http://www.tradingmarkets.com.

Plastics Today Staff, "TonenGeneral and Toray team up to create lithium-ion battery separator films", plasticstoday.com, Nov. 4, 2009, 2 pages, http://www.plasticstoday.com.

Montanari, F., et al., "Hydroxymethyl Derivatives of 18-Crown-6 and [2.2.2] Cryptand: Versatile Intermediates for the Synthesis of Lipophilic and Polymer-Bonded Macrocyclic Ligands," J. Org. Chem, 1982, 47, 1298-1302.

Babb, D. A., "Synthesis and Metal Ion Complexation of Synthetic Ionophores," A Ph.D. Dissertation in Chemistry, Texas Tech University, Dec. 1985, 149 pages.

Manecke, G., et al., "Polymere Kryptanden, 1", Makromol. Chem. 182, 1973-1984, (1981).

Kopolow, S., et al., "Poly(vinyl macrocyclic polyethers). Synthesis and Cation Binding Properties", vol. 6, No. 1, Jan.-Feb. 1973, pp. 133-142.

Smid, J., et al., "Synthesis of 4'-Vinylbenzocrown Ethers", Organic Preparations and Procedures Int. 8(4), 1976, pp. 193-196.

\* cited by examiner

LITHIUM ION BATTERY ELECTRODES

CROSS-REFERENCE TO RELATED APPLICATIONS

This application claims the benefit of U.S. Provisional Patent Application Ser. No. 61/884,619, filed Sep. 30, 2013, which is incorporated by reference herein in its entirety.

TECHNICAL FIELD

The present disclosure relates generally to lithium ion battery electrodes.

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A positive electrode for a lithium ion battery includes a lithium transition metal oxide-based active material and a high surface area carbon. The positive electrode further includes a reactive binder having a macrocycle tethered thereto.

BRIEF DESCRIPTION OF THE DRAWINGS

Features and advantages of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

DETAILED DESCRIPTION

Figure 1:
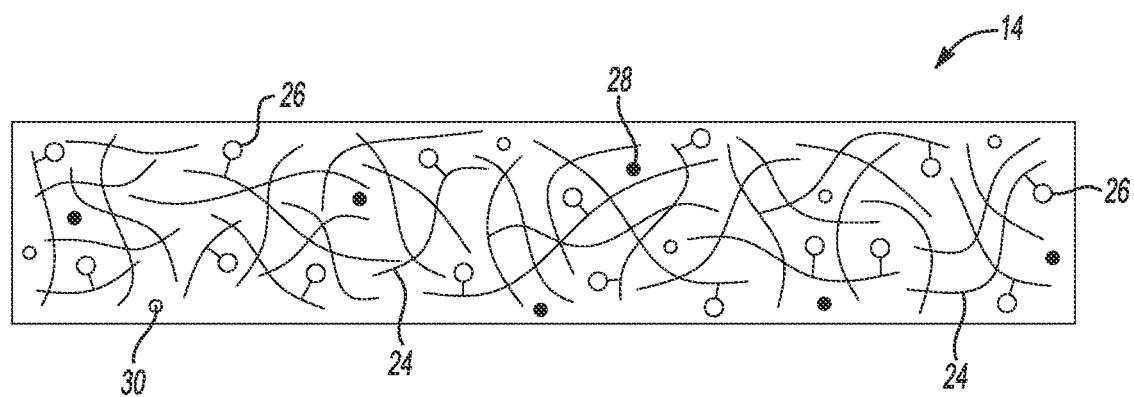
FIG. 1 is a schematic, cross-sectional view of an example of a positive electrode according to the present disclosure, formed with a reactive binder having a macrocycle bonded thereto.

A lithium ion battery generally operates by reversibly passing lithium ions between a negative electrode (sometimes called an anode) and a positive electrode (sometimes called a cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in an aprotic non-aqueous solvent.

It has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning." In one example, a graphite electrode is poisoned by $Mn^{+2}$, $Mn^{+3}$, or $Mn^{+4}$ cations that dissolve from spinel $Li_xMn_2O_4$ of the positive electrode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn metal can poison the graphite electrode and prevent reversible electrode operation, thereby deleteriously affecting the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge-discharge cycling).

The poisoning of the lithium ion battery by transition metals dissolving from the positive electrode may be reduced or prevented by using examples as disclosed herein of the novel Li-ion battery positive electrode (cathode) including reactive binders functionalized with transition metal (henceforth denoted by "TM") cation (e.g., $Mn^{+2}$)-trapping macrocycles.

Examples of the present disclosure advantageously incorporate reactive binders (e.g., lithium salts, sodium salts, or potassium salts of acid cellulosic compounds (such as, e.g., alginate or carboxymethyl cellulose); β-cyclodextrin; polyvinyl alcohol (and its acetate copolymers); and polyacrylic acid) functionalized with TM cation trapping cage structures (e.g., crown ethers, cryptands, etc.) in Li-ion battery positive electrodes.

The reactive binder part achieves a better coverage of the electronically conductive carbon black filler than is achievable with fluorinated polymer binders, while its reactive groups (hydroxyl, carboxylate) can react with aggressive chemical species that result from the decomposition of the $PF_6^-$ anion and solvent molecules, especially at high temperatures and high voltages, thus preventing build-up of films on the surface of active material particles that can deleteriously lead to an increased cell resistance.

The cage structures trap metal cations that can leach from the positive electrode of a Li-ion battery before they reach the carbon negative electrode and lead to performance degradation.

Suitable macrocycles include chelating agents such as metal ionophores, which, as used herein, are chemical compounds that bind to particular ions (e.g., $Mn^{+2}$ or other TM cations) while allowing the passage of lithium ions. Inside the battery, the macrocycle tethered (i.e., chemically bonded) to the reactive binder effectively traps the unwanted metal cations so that movement of lithium ions across the microporous polymer separator is not affected during operation of the battery. In an example, the macrocycle selectively complexes with the unwanted metal cations, for example, by immobilizing the metal cations (e.g., $Co^{+2}$, $Fe^{+2}$, $Mn^{+2}$, $Ni^{+2}$, etc.) that may dissolve into the electrolyte solution from the positive electrode. The tethered macrocycle thus operates as a metal cation scavenger molecule that traps and immobilizes the unwanted metal cations to prevent the migration of the metal cations through the electrolyte solution and to the negative electrode. It is to be understood that the macrocycles complex less strongly with lithium ions (e.g., a single trapping site out of each one hundred sites are occupied by a Li cation compared to a Mn cation), and thus do not adversely affect the movement of lithium ions between the negative and positive electrodes.

In addition, it is believed that positive electrodes incorporating the reactive binders having macrocycles tethered thereto according to examples of the present disclosure may be able to efficiently operate at above-ambient temperatures without performance degradation. It is further believed that examples of the present disclosure lead to improved Li-ion battery durability (cycle and calendar life). Further, examples of the present disclosure may lead to lower system cost through simplification or possible elimination of the thermal management system of the lithium ion battery.

Referring now to FIG. 1, an example of a positive electrode according to the present disclosure is designated generally at reference numeral 14. The positive electrode 14 is formed with a reactive binder 24 having a macrocycle 26 tethered thereto.

Some suitable examples of reactive binders 24 include Li-, Na-, or K-salts of acid cellulosic compounds (such as, e.g., alginate or carboxymethyl cellulose); β-cyclodextrin; polyvinyl alcohol (and its acetate copolymers); polyacrylic acid; polyundecylenol; polyvinylbenzyl alcohol; polybenzylalcohol; and the like.

Some specific examples of the reactive binders 24 include the following:

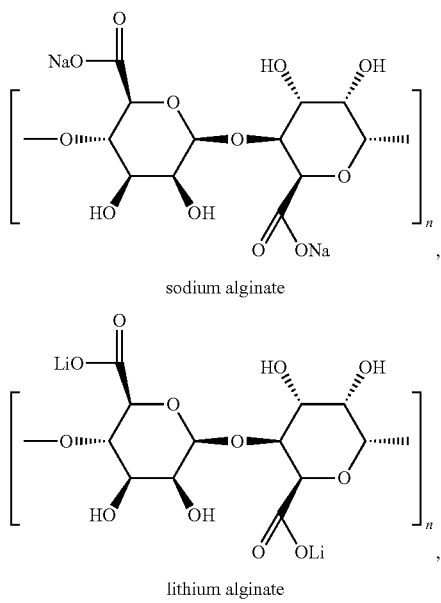

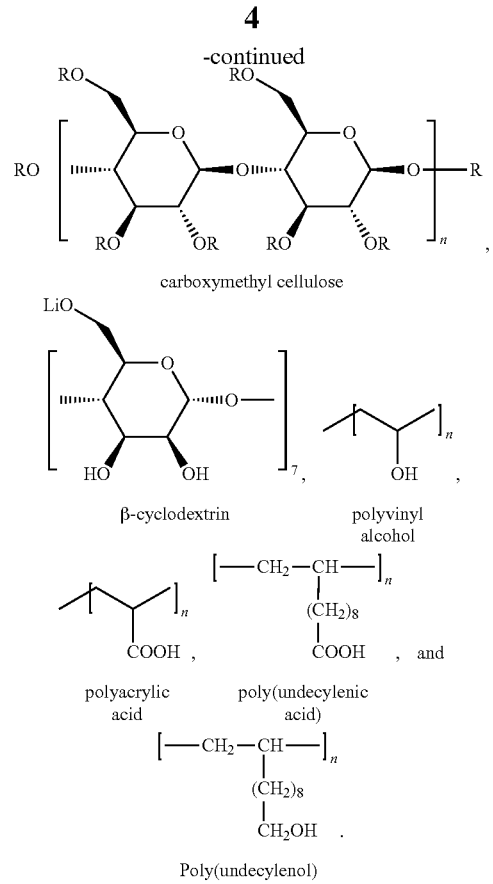

Examples of the macrocycle 26 that is attached to the reactive binder 24 may be a crown ether, a crown ether having at least one ether oxygen substituted with a heteroatom, a pod and, a lariat ether, a calixarene, a calixcrown, or combinations thereof. A generalized description of some of these macrocycles is provided herein.

A crown ether is a cyclic ether in which the ether ring includes oxygen atoms that can complex with a transition metal cation. In many examples, the cyclic ether is a macrocycle. Some or all of the oxygen atoms in the ether ring may be exchanged for nitrogen atoms, a class of crown ethers known as azacrowns, or sulfur atoms, a class of crown ethers known as thiacrowns. The crown ether may be monocyclic, in which the crown ether forms a somewhat two-dimensional ring for complexing with a transition metal cation, or polycyclic, in which the crown ether forms a more three-dimensional cage for complexing with a metal cation. One example of a polycyclic crown ether is a cryptand (such as, e.g., cryptand [2.2.2], cryptand [2.2.1], and cryptand [2.1.1]; the "[$N_1.N_2.N_3$]" notation is a short-hand proposed by Jean-Marie Lehn). One or more oxygen atoms in the cryptand or other crown ether may also be substituted at any location along its ether ring by any of a variety of atoms or functional groups known to those skilled in the art. For example, the cryptand may include sulfur substituted at one or more oxygen sites, or may include nitrogen substituted at one or more oxygen sites.

It is believed that crown ethers having structures where i) the size of the cavity defined by the crown structure has a diameter that is close to the size of the ion (e.g., the transition metal cation) to be trapped, and ii) a permanent dipole moment possesses a maximum charge for any given separation between positive and negative charges of the structure are most desirable for use in the examples of the lithium battery disclosed herein. For instance, a macrocycle possessing a permanent dipole moment (such as crown ethers having an odd number of oxygen atoms in its polyether ring (e.g., 9-crown-3,15-crown-5, etc.), and further have thia- (i.e., sulfur) or aza- (i.e., nitrogen) substitutions that tend to break the symmetry of the charge distribution of a symmetric crown ether (such as 12-crown-4 or 18-crown-6) or an increase in the charge separation in an asymmetric macrocycle) will align counter-parallel to an externally applied electric field to minimize its potential energy in the applied field. This will, in effect, maximize the ion trapping ability of the crown ether.

Further, a podand is an acyclic polyether ligand that includes donor-group-bearing arms that can complex with a metal cation. A lariat ether is a crown ether that includes a donor-group-bearing side-arm that provides additional metal cation binding sites beyond those present on the polyether ring. A calixarene is a metacyclophane of methylene-bridged phenol units, and is generally found in one of a cone, partial cone, 1,2-alternate, or 1,3-alternate conformation. A calix-crown is a calixarene that includes a polyether ring that links two phenolic oxygens of the calixarene framework. The indifference these macrocycles show towards complexing with lithium ions is likely ascribed to their relatively large polyether ring or cage structures and/or the spatial orientation of their functional donor-group-bearing arms when compared to the relatively small size of lithium ions. Analogs and structurally related molecules of the macrocycles just mentioned may also be employed.

A list of some macrocycles 26 that may be tethered to the reactive binder in examples of the present disclosure include:

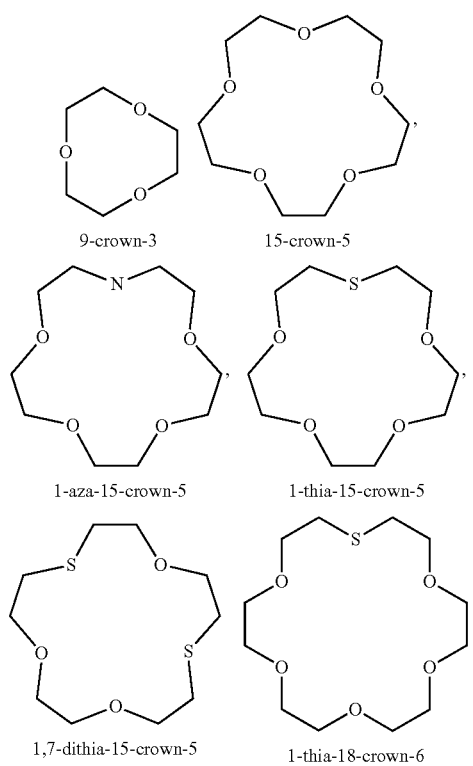

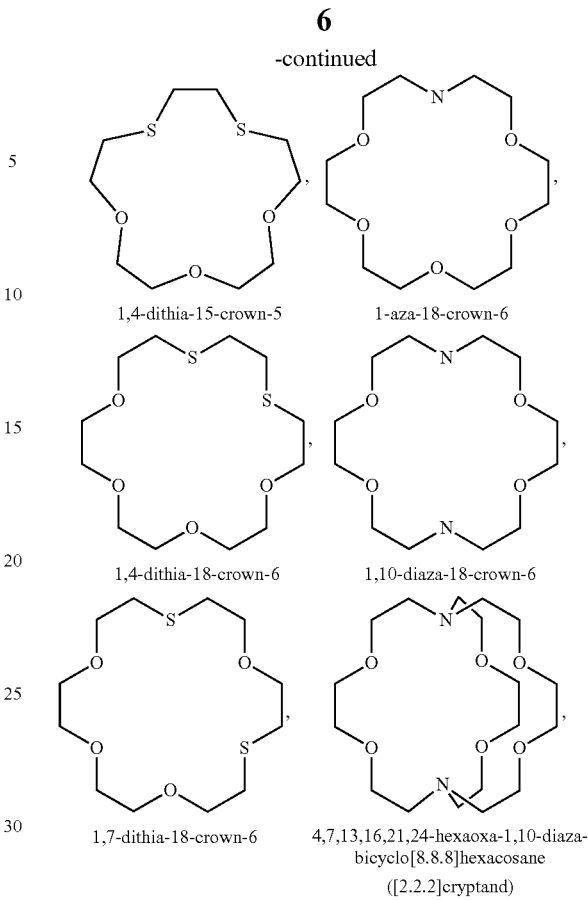

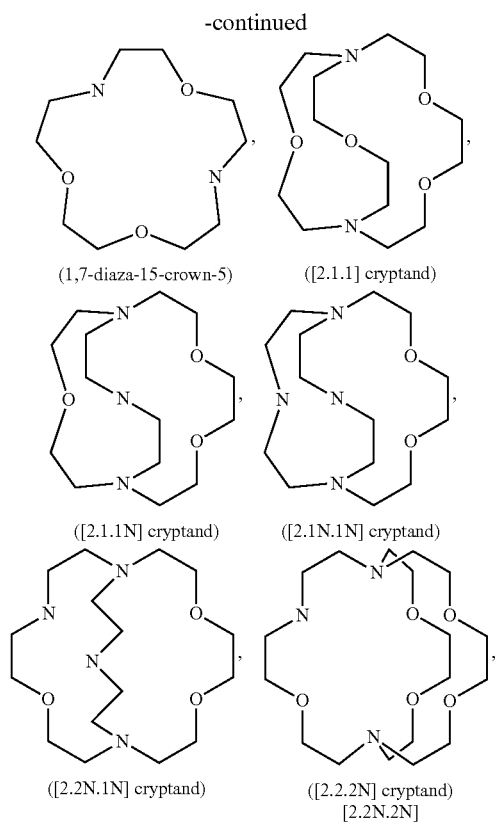

(1,7-diaza-15-crown-5), ([2.1.1] cryptand), ([2.1.1N] cryptand), ([2.1N.1N] cryptand), ([2.2N.1N] cryptand), ([2.2.2N] cryptand) [2.2N.2N]

cryptand, and combinations thereof. Still other examples of suitable macrocycles 26 include ortho-phenanthroline, trili-thioethylenediaminetriacetate acetamide, dilithioiminodiac-etate, and the like. Any hydrogen atoms in these structures are assumed.

The positive electrode 14 further includes a lithium transition metal based active material 28, and a conductive carbon 30. It is to be understood that any lithium transition metal based active material 28 that can sufficiently undergo lithium intercalation and deintercalation while functioning as the positive terminal of a lithium ion battery may be used. Examples of the active material 28 include at least one of spinel lithium manganese oxide ($LiMn_2O_4$), lithium cobalt oxide ($LiCoO_2$), a manganese-nickel oxide spinel [Li($Mn_{1.5}Ni_{0.5}$)$O_2$], a layered nickel-manganese-cobalt oxide [Li($Ni_{1-x}Mn_{1-y}Co_{x+y}$)$O_2$], $LiNiO_2$, $Li_2MSiO_4$ (M=Co, Fe, Mn), a lithium iron polyanion oxide, such as lithium iron phosphate ($LiFePO_4$) or lithium iron fluorophosphate ($Li_2FePO_4F$), or a lithium rich layer-structure cathode, such as $xLi_2MnO_3$-(1−x)$LiMO_2$ (M is composed of any ratio of Ni, Mn and Co). Other lithium-based active materials may also be utilized, such as $LiNi_{1-x}Co_{1-y}M_{x+y}O_2$, $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, M composed of any ratio of Al, Ti, Cr, and/or Mg), lithium vanadium oxide ($LiV_2O_5$), $Li_2MSiO_4$ (M is composed of any ratio of Co, Fe, and/or Mn), $xLi_2MnO_3$-(1−x)$LiMO_2$ (M is composed of any ratio of Ni, Mn and/or Co), and any other high energy nickel-manganese-cobalt material (HE-NMC). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The conductive carbon 30 of the positive electrode 14 may be any high surface area carbon, such as acetylene black, that intermingles with the lithium transition metal based active material 28. "High surface area carbon" as used herein is meant to include any carbon having a BET (=Brunauer-Emmett-Teller) surface area ranging from 50 to 2,000 m²/g. The conductive carbon 30 may be added to ensure electron conduction between a current collector of the lithium ion battery 10 and the active material particles 28 of the positive electrode 14.

The reactive binder 24 of the electrode 14 is capable of structurally holding the lithium-based active material 28 together.

Figure 2:
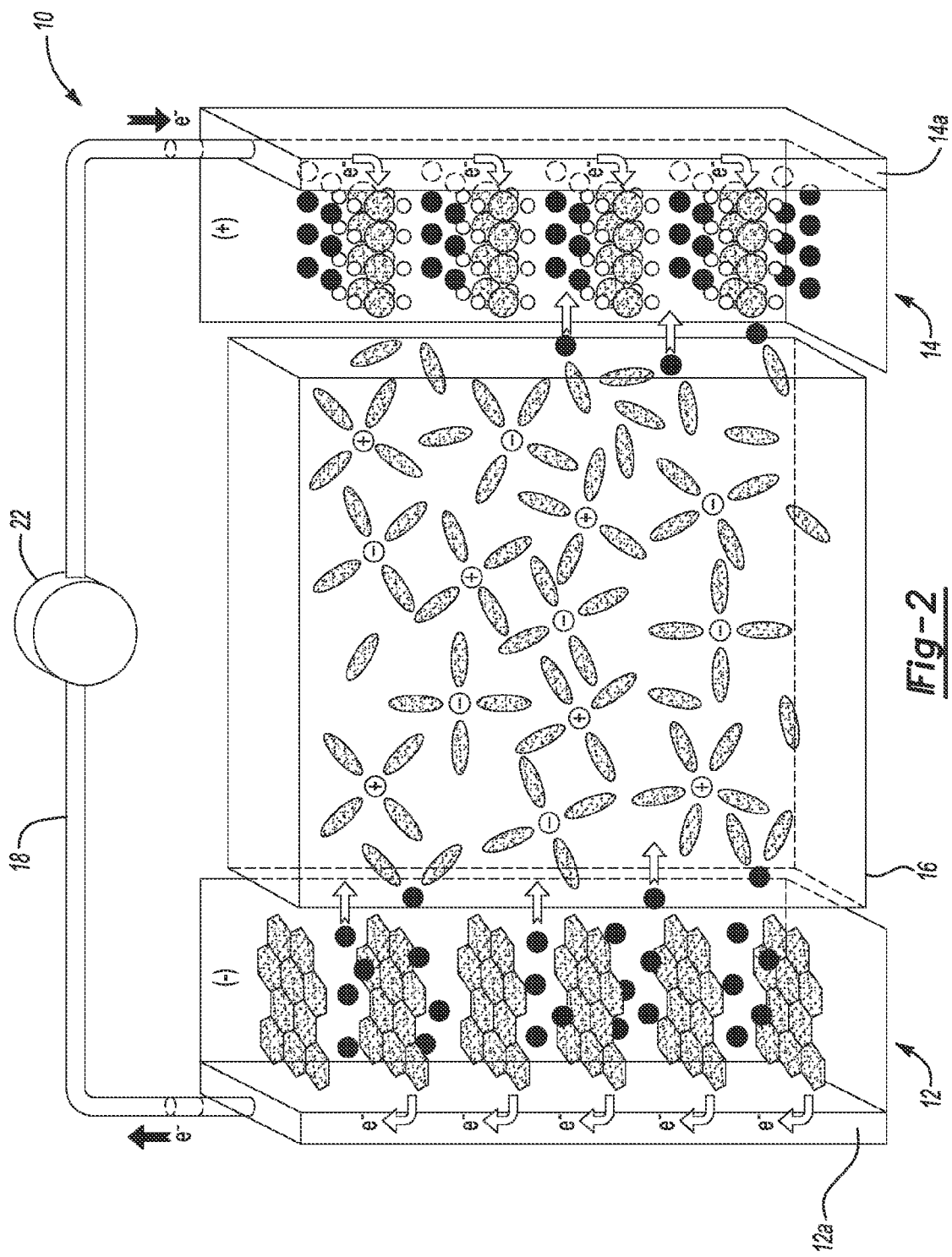
FIG. 2 is a schematic, perspective view of an example of a lithium ion battery during a discharging state, where the positive electrode of the battery is formed with an example of the reactive binder having the macrocycle bonded thereto.

Referring now to FIG. 2, an example of the lithium ion battery 10 is illustrated, incorporating an example of the positive electrode 14 disclosed herein. The lithium ion battery 10 generally includes a negative electrode 12, a negative-side current collector 12a, a positive electrode 14, a positive-side current collector 14a, and a microporous separator 16 disposed between a negative electrode 12 and the positive electrode 14.

The separator 16, which operates as both an electrical insulator and a mechanical support, is sandwiched between the negative electrode 12 and the positive electrode 14 to prevent physical contact between the two electrodes 12, 14 and the occurrence of a short circuit. The separator 16, in addition to providing a physical barrier between the two electrodes 12, 14, ensures passage of lithium ions (identified by the black dots and by the open circles having a (+) charge in FIG. 2) and related anions (identified by the open circles having a (−) charge in FIG. 2) through an electrolyte solution filling its pores.

The negative electrode 12 may include any lithium host active material that can sufficiently undergo lithium intercalation and deintercalation while functioning as the negative terminal of the lithium ion battery 10. Examples of the lithium host active material include graphite or a low surface area amorphous carbon. Graphite is widely utilized to form the negative electrode 12 because it exhibits favorable lithium intercalation and deintercalation characteristics, is relatively non-reactive, and can store lithium in quantities that produce a relatively high energy density. Commercial forms of graphite that may be used to fabricate the negative electrode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate, silicon or silicon-carbon composites, and tin oxide.

The negative electrode 12 may also include a polymer binder material intermingled with the lithium host active material to structurally hold the lithium host active material together. Examples of the binder include polyvinylidene fluoride (PVdF), an ethylene propylene diene monomer (EPDM) rubber, or carboxymethyl cellulose (CMC). These materials (i.e., the lithium host active material and the binder) may be mixed with a high surface area carbon, such as acetylene black, to ensure electron conduction between the current collector (shown as 12a in FIG. 2) and the active material particles of the negative electrode 12. The negative-side current collector 12a may be formed from copper or any other appropriate electrically conductive material known to skilled artisans.

Adjacent to the positive electrode 14 is the positive-side current collector 14a, which may be formed from aluminum or any other appropriate electrically conductive material known to skilled artisans.

The negative-side current collector 12a and the positive-side current collector 14a may be positioned in contact with the negative electrode 12 and the positive electrode 14, respectively, to collect and move free electrons to and from an interruptible external circuit 18, which connects the negative electrode 12 and the positive electrode 14.

Each of the negative electrode 12, the positive electrode 14, and the porous separator 16 are soaked in an electrolyte solution. It is to be understood that any appropriate electrolyte solution that can conduct lithium ions between the negative electrode 12 and the positive electrode 14 may be used in the lithium ion battery 10. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10, as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(CF_3SO_2)_2$ (LiTFSI), $LiN(FSO_2)_2$ (LiFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The electrolyte solution may also include a number of additives, such as solvents and/or salts that are minor components of the solution. Example additives include lithium bis(oxalato borate) (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, tiophene, 3,4-ethylenedioxythiophene, 2,5-dihydrofuran, trishexafluoro-iso-propylphosphate, trihydroxybenzene, tetramethoxytitanium, etc. While some examples have been given herein, it is to be understood that other additives could be used. When included, additives may make up from about 0.05% to about 5% of the composition of the electrolyte solution.

Other electrolytes may be used instead of the electrolyte solution. As examples, polymer electrolytes, ionic liquids, melt electrolytes, or the like may be used. Some specific examples of ionic liquids include 1-ethyl-3-methylimidazolium bis(fluorosulfonyl)imide, 1-ethyl-3-methylimidazolium bis(trifluoromethane sulfonyl)imide, phosphonium bis(trifluoromethane sulfonyl)imide, phosphonium bis(fluorosulfonyl)imide, triethyl(methoxymethyl)phosphonium bis(trifluoromethylsulfonyl)imide, triethyl(2-methoxyethyl)phosphonium, and bis(trifluoromethylsulfonyl)imide. Some examples of melt electrolytes include lithium bis(fluorosulfonyl)imide in dimethylmethanesulfonamide and lithium bis(trifluoromethane sulfonyl)imide in dimethylmethanesulfonamide. While some examples have been given herein, it is to be understood that other polymer electrolytes, ionic liquids, and melt electrolytes could be used.

The microporous polymer separator 16 includes, or in some examples, is a membrane, and this membrane may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available polyolefin microporous polymer separators 16 include CELGARD® 2500 (a monolayer polypropylene separator) and CELGARD® 2320 (a trilayer polypropylene/polyethylene/polypropylene separator) available from Celgard LLC. Some other commercially available separators are available from Entek International, Asahi-Kasei Corporation, Toray Industries, and SK Energy.

In another example, the membrane of the microporous polymer separator 16 (which may also be referred to herein as simply the microporous polymer separator 16) may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane of the separator 16 is poly(p-hydroxybenzoic acid). In yet another example, the membrane may be a combination of one of these polymers and a polyolefin (such as PE and/or PP).

In yet another example, the membrane of the microporous separator 16 may be chosen from a combination of the polyolefin (such as PE and/or PP) and one or more of the polymers for the separator 16 listed above.

The microporous polymer separator 16 may contain a single layer or a multi-layer laminate fabricated from either a dry or wet process, by solvent casting, by a non-woven fiber laying process, or by any other process for making a microporous polymer membrane with properties suitable for application in Li-ion batteries. For example, in one example, a single layer of the polyolefin may constitute the entirety of the microporous polymer separator 16 membrane. In another example, a single layer of one or a combination of any of the polymers from which the microporous polymer separator 16 may be formed (e.g., the polyolefin and/or one or more of the other polymers listed above for the separator 16) may constitute the entirety of the separator 16. As another example, however, multiple discrete layers of similar or dissimilar polyolefins and/or polymers for the separator 16 may be assembled into the microporous polymer separator 16. In one example, a discrete layer of one or more of the polymers may be coated on a discrete layer of the polyolefin for the separator 16. Further, the polyolefin (and/or other polymer) layer, and any other optional polymer layers, may further be included in the microporous polymer separator 16 as a fibrous layer to help provide the microporous polymer separator 16 with appropriate structural and porosity characteristics. A more complete discussion of single and multi-layer lithium ion battery separators, and the dry and wet processes that may be used to make them, can be found in P. Arora and Z. Zhang, "Battery Separators," *Chem. Rev.*, 104, 4424-4427 (2004).

Still other suitable polymer separators 16 include those that have a ceramic layer attached thereto, and those that have ceramic filler in the polymer matrix (i.e., an organic-inorganic composite matrix).

An example of a method for making a positive electrode 14 for a lithium ion battery 10 includes functionalizing, through an ester, amide, ether, or isocyanate linkage, the reactive binder 24 with the macrocycle 26 to form a functionalized reactive binder. The ester, amide, ether, or isocyanate acts as a linker or linking group to connect the reactive binder 24 to the macrocycle 26. Some example linking groups include —CH$_2$—, an ethoxy group, a methoxy group, an undecylenyl group, or the like. Some generic reactions for the attachment of crown ethers to binder polymers include the following:

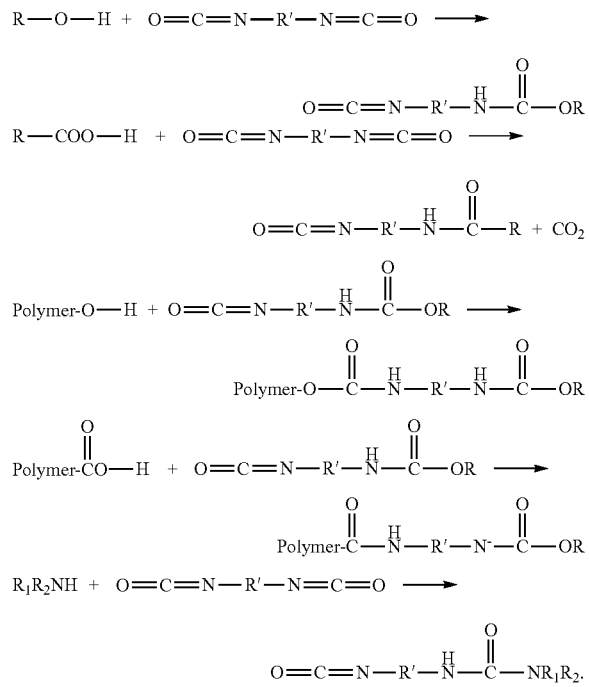

Suitable isocyanates and diisocyanates that may be used in these reactions include the following:

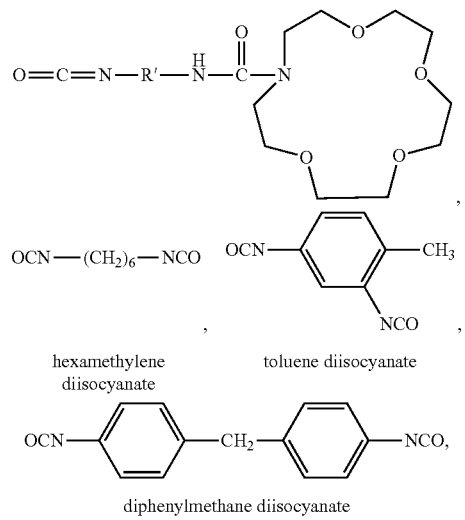

and the like.

The example method further includes mixing the functionalized reactive binder with a lithium transition metal oxide-based active material 28 and a high surface area carbon 30. It is to be understood that the active material 28, the high surface area carbon 30, and the functionalized reactive binder may be present in any suitable amounts. However, in an example, the active material 28 is present in an amount ranging from about 90% by weight to about 95% by weight, the high surface area carbon 30 is a conducting carbon black filler present in an amount ranging from about 2% by weight to about 6% by weight, and the functionalized reactive binder is present in an amount ranging from about 3% by weight to about 6% by weight.

The lithium ion battery 10 may support a load device 22 that can be operatively connected to the external circuit 18, which connects the negative electrode 12 and positive electrode 14. The load device 22 receives a feed of electrical energy from the electric current passing through the external circuit 18 when the lithium ion battery 10 is discharging. While the load device 22 may be any number of known electrically-powered devices, a few specific examples of a power-consuming load device 22 include an electric motor for a hybrid vehicle or an all-electrical vehicle, a laptop computer, a cellular phone, and a cordless power tool. The load device 22 may also, however, be an electrical power-generating apparatus that charges the lithium ion battery 10 for purposes of storing energy. For instance, the tendency of windmills and solar panels to variably and/or intermittently generate electricity often results in a need to store surplus energy for later use.

The lithium ion battery 10 may also include a wide range of other components that, while not depicted here, are nonetheless known to skilled artisans. For instance, the lithium ion battery 10 may include a casing, gaskets, terminals, tabs, and any other desirable components or materials that may be situated between or around the negative electrode 12 and the positive electrode 14 for performance-related or other practical purposes. Moreover, the size and shape of the lithium ion battery 10, as well as the design and chemical make-up of its main components, may vary depending on the particular application for which it is designed. Battery-powered automobiles and hand-held consumer electronic devices, for example, are two instances where the lithium ion battery 10 would most likely be designed to different size, capacity, and power-output specifications. The lithium ion battery 10, or a plurality of lithium ion batteries, may also be connected in series and/or in parallel with other similar lithium ion batteries to produce a greater voltage output and current (if arranged in parallel) or voltage (if arranged in series) if the load device 22 so requires.

The lithium ion battery 10 generally operates by reversibly passing lithium ions between the negative electrode 12 and the positive electrode 14. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 14, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the negative electrode 12 of the lithium ion battery 10 contains a high concentration of intercalated lithium while the positive electrode 14 is relatively depleted. When the negative electrode 12 contains a sufficiently higher relative quantity of intercalated lithium, the lithium ion battery 10 can generate a beneficial electric current by way of reversible electrochemical reactions that occur when the external circuit 18 is closed to connect the negative electrode 12 and the positive electrode 14. The establishment of the closed external circuit under such circumstances causes the extraction of intercalated lithium from the negative electrode 12. The extracted lithium atoms are split into lithium ions (identified by the black dots and by the open circles having a (+) charge) and electrons (e−) as they leave an intercalation host at the negative electrode-electrolyte interface.

The chemical potential difference between the positive electrode 14 and the negative electrode 12 (ranging from about 2.0V to about 5.0V, depending on the exact chemical make-up of the electrodes 14, 12) drives the electrons (e−) produced by the oxidation of intercalated lithium at the negative electrode 12 through the external circuit 18 towards the positive electrode 14. The lithium ions, which are also produced at the negative electrode 12, are concurrently carried by the electrolyte solution through the porous separator 16 towards the positive electrode 14. The electrons (e−) flowing through the external circuit 18 and the lithium ions migrating across the separator 16 in the electrolyte solution eventually reconcile and form intercalated lithium at the positive electrode 14. The electric current passing through the external circuit 18 can be harnessed and directed through the load device 22 until the level of intercalated lithium in the negative electrode 12 falls below a workable level or the need for electrical energy ceases.

The lithium ion battery 10 can be charged or re-powered at any time after a partial or full discharge of its available capacity by applying an external battery charger to the lithium ion battery 10 to reverse the electrochemical reactions that occur during battery discharge. The connection of an external power source to the lithium ion battery 10 compels the otherwise non-spontaneous oxidation of lithium transition metal oxide or phosphate at the positive electrode 14 to produce electrons and release lithium ions. The electrons, which flow back towards the negative electrode 12 through the external circuit 18, and the lithium ions, which are carried by the electrolyte across the microporous polymer separator 16 back towards the negative electrode 12, reunite at the negative electrode 12 and replenish it with intercalated lithium for consumption during the next battery discharge cycle.

The external battery charger that may be used to charge the lithium ion battery 10 may vary depending on the size, construction, and particular end-use of the lithium ion battery 10. Some suitable external battery chargers include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosure.

EXAMPLES

Preparation of Sodium Alginate with Tethered Aza-15-Crown Ether Groups

Sodium alginate powder (Cat. No. 218295, MPI, 1 g, ~0.00286 mol) is suspended in ethyl acetate (25 mL) in a glass jar (50-mL capacity, Fisher Scientific) and is then homogenized using an IKA Turrax t25 homogenizer for several minutes until the mixture reaches about 50° C. With magnetic stirring, aza-15-crown-5 (IBC Technologies, 0.626 g, 0.00286 mol) is added, followed by the drop-wise addition of hexamethylene diisocyanate (0.481 g, 0.00286 mol) with magnetic stirring. The lid of the jar is secured, and the mixture is placed on a roll mill for 8 hours. The mixture is transferred to a 50-mL capacity centrifuge tube (Fisher Scientific) and centrifuged for 10 minutes at 1000 rpms. The liquid phase is decanted off from the solid and evaporated using a rotary evaporator, leaving behind a small residue (0.1 g). The vacuum dried solid remaining is 1.8 g. A portion of this product suspended in water using the Turrax t25 homogenizer is used as an electrode binder in a lithium ion battery. This preparation is repeated using toluene isocyanate (0.498 g, 0.00286 mol), and again with diphenyl methane diisocyanate (0.715 g, 0.00286 mol) instead of using hexamethylene diisocyanate. It is believed that one of the isocyanate groups of the diisocyanate reacts with the hydroxy-groups on the alginate forming a urethane group, while the other remaining pendant isocyanate groups react with aza-15-crown-5 to form a urea group.

Preparation of Lithium Alginate with Tethered Aza-15-Crown Ether Groups

Ethyl acetate (50 mL) is added to a 250-mL Morton flask equipped with two addition funnels, a mechanical stirrer, and an argon inlet. Hexamethylene diisocyanate (0.481 g, 0.00286 mol) in ethyl acetate (50 mL) and aza-15-crown-5 (0.626 g, 0.00286 mol) in ethyl acetate (50 mL) are then added separately, simultaneously, and drop-wise with vigorous stirring. After complete addition, the mixture is allowed to stir for 8 hours. This mixture is then added drop-wise to a vigorously stirred, homogenized dispersion of sodium alginate powder (Cat. No. 218295, MPI, 1 g, ~0.00286 mol) suspended in ethyl acetate (25 mL). The sodium alginate dispersion is homogenized with an IKA Turrax t25 homogenizer for several minutes until the mixture reaches about 50° C. After complete addition, stirring is continued for 16 hours. The ethyl acetate is then removed using a rotary evaporator and the remaining vacuum-dried, solid residue is 2 g. This product suspended in water using the Turrax t25 homogenizer is dialyzed (Spectra/Por dialysis tubing, 12,000-14,000 molecular weight cut-off, Fisher Scientific) against aqueous 1-molar lithium chloride (4 L) for two days and then against de-ionized water (4 L) with at least 2 water changes per day for 1 week. This dispersion is then used as an electrode binder in a lithium ion battery. This preparation is repeated using toluene isocyanate (0.498 g, 0.00286 mol) and again with diphenyl methane diisocyanate (0.715 g, 0.00286 mol) instead of using hexamethylene diisocyanate. It is believed that one of the isocyanate groups of the diisocyanate reacts with the aza-15-crown-5 to form a urea group and then subsequently the other isocyanate group of the diisocyanate adduct reacts with the hydroxy-groups on the alginate forming a urethane group. Alternatively, carboxymethyl cellulose, β-cyclodextrin, polyvinyl alcohol (and its acetate copolymers) and polyacrylic acid can be used to replace sodium alginate in the reaction.

An acid group on the polymer can also react with an isocyante group to form an amide linkage, which is another means to tether a chelating agent/macrocycle to the polymer.

Aqueous Preparation of Lithium Alginate with Tethered Aminomethyl-15-Crown-5

Sodium alginate (1 g, 0.00286 mol) in water (99 g) is homogenized with a Turrax t25 homogenizer until a homogenous dispersion is formed. The dispersion is then cooled to 4° C. in an ice bath. Aqueous N-hydroxysulfosuccinimide sodium salt (1.863 g, 0.00858 mol) is then added, and the containers are stirred for 30 min. Freshly prepared, aqueous N-(trimethyl-3-propylammonium)-N'-ethylcarbodimide) iodide, [CH$_3$)$_3$N$^+$—CH$_2$CH$_2$CH$_2$—N=C=N—CH$_2$CH$_3$I$^-$], (1.27 g, 0.00429 mol) is added, and the reaction mixture is stirred for 1.5 hours in a 4° C. refrigerator. Then, the pH of the solution is adjusted to around 7.4 with a pH 9.2, 0.2 M phosphate buffer. An aqueous solution of 2-aminomethyl-15-crown-5 (0.712 g, 0.00286 mol) is then added. The pH of the reaction solution is then adjusted to around 7.4 (an optimal pH for the coupling reaction to occur), and the reaction mixture is stirred at 4° C. for 24 h. The reaction mixture is then dialyzed against pH 7.4, 5-mM phosphorous buffer in aqueous lithium chloride for two days and then against de-ionized water with frequent water changes for 1 week. The dispersion is then used as an electrode binder in a lithium ion battery. Alternatively, 1-Aza-15-crown-5 (0.626 g, 0.00286 mol) can be used instead of 2-aminomethyl-15-crown-5; however, the tethering reaction generally proceeds less effectively. Moreover, polyacrylic acid can be used to replace sodium alginate (or alginate with other cations, such as Li$^+$) in the reaction.

It is to be understood that the ranges provided herein include the stated range and any value or sub-range within the stated range. For example, a range from about 2.0 volts to about 5.0 volts should be interpreted to include not only the explicitly recited limits of about 2.0 volts to about 5.0 volts, but also to include individual values, such as 3 volts, 4.2 volts, etc., and sub-ranges, such as from about 3.1 volts to about 3.9 volts, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A positive electrode for a lithium ion battery, comprising:
    a lithium transition metal oxide-based active material;
    a conductive high surface area carbon black filler; and
    a reactive binder functionalized with a macrocycle, wherein the reactive binder is selected from the group consisting of alginate, polyacrylic acid, polyundecylenic acid, and combinations thereof.

2. The positive electrode as defined in claim 1 wherein the macrocycle is selected from the group consisting of a crown ether, a podand, a lariat ether, a calixarene, a calixcrown, and combinations thereof.

3. The positive electrode as defined in claim 1 wherein the macrocycle is selected from the group consisting of

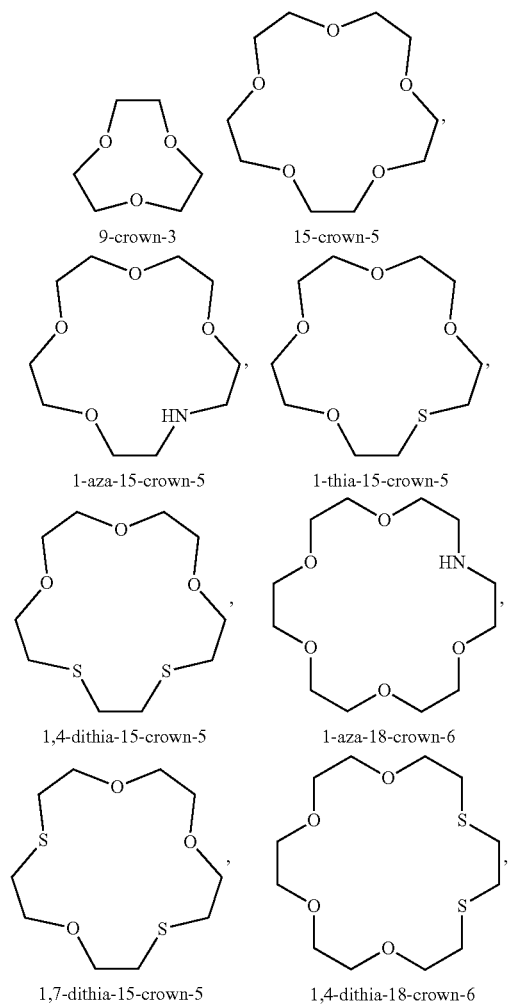

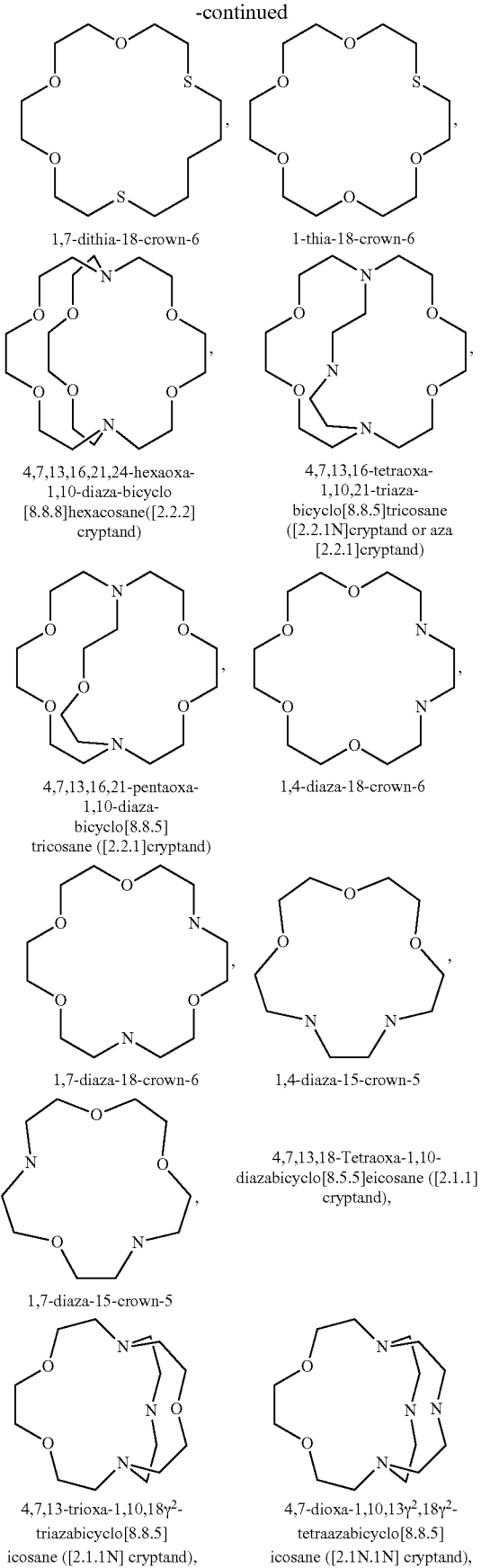

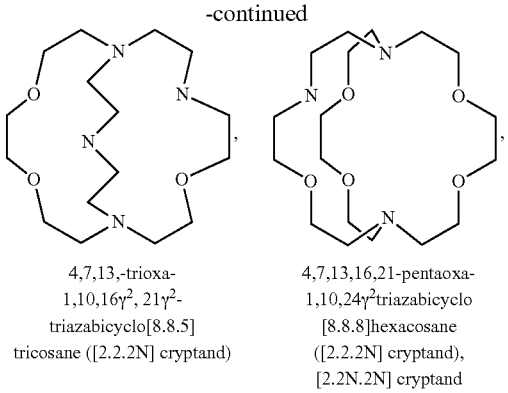

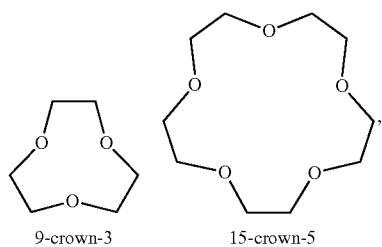

and combinations thereof.

4. The positive electrode as defined in claim 1 wherein:

the conductive high surface area carbon black filler is acetylene black; and the lithium transition metal oxide-based active material is selected from the group consisting of $LiMn_2O_4$, $LiCoO_2$, $Li(Mn_{1.5}Ni_{0.5})O_2$, $LiFePO_4$, $Li_2FePO_4F$, $LiNi_{1-x}Co_{1-y}M_{x+y}O_2$ (M is a metal), $Li_xMn_{2-y}Al_yO_4$, and $LiV_2O_5$.

5. The positive electrode as defined in claim 1, wherein a linking group connects the macrocycle to the reactive binder.

6. A lithium ion battery, comprising:

a positive electrode, including:

a lithium transition metal oxide-based active material;

a conductive high surface area carbon black filler; and a reactive binder functionalized with a macrocycle, wherein the reactive binder is selected from the group consisting of: alginate, polyacrylic acid, polyundecylenic acid, and combinations thereof;

a negative electrode; and a microporous polymer separator soaked in an electrolyte solution, the microporous polymer separator being disposed between the positive electrode and the negative electrode.

7. The lithium ion battery as defined in claim 6 wherein:

the macrocycle is selected from the group consisting of a crown ether, a podand, a lariat ether, a calixarene, a calixcrown, and combinations thereof.

8. The lithium ion battery as defined in claim 7 wherein the macrocycle is selected from the group consisting of

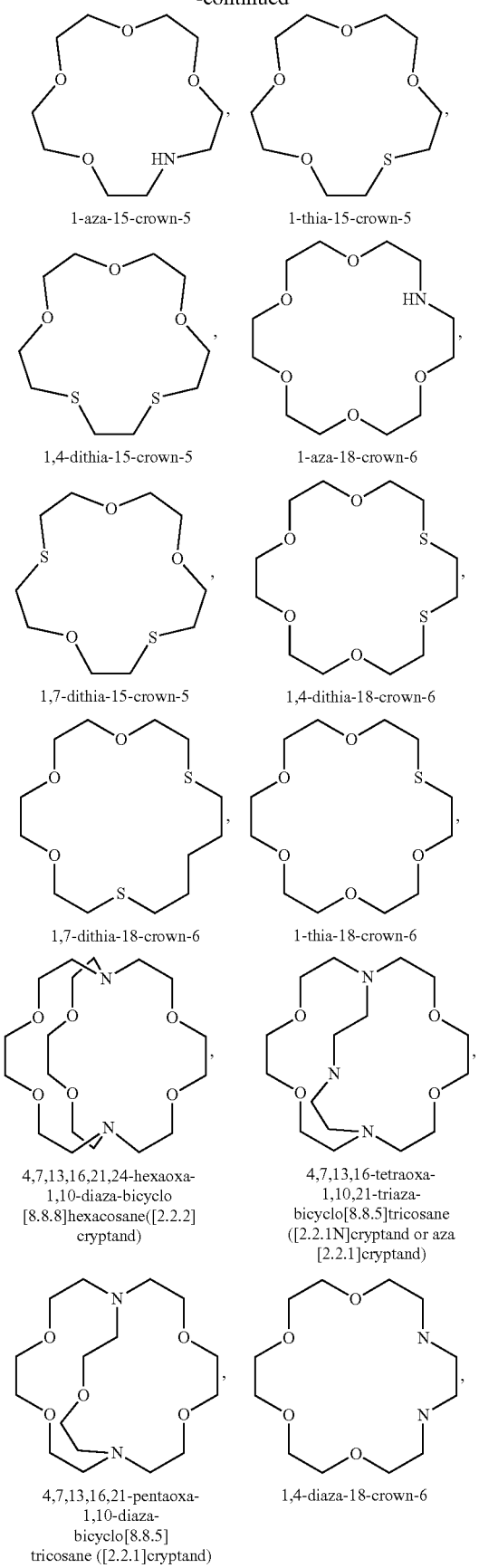

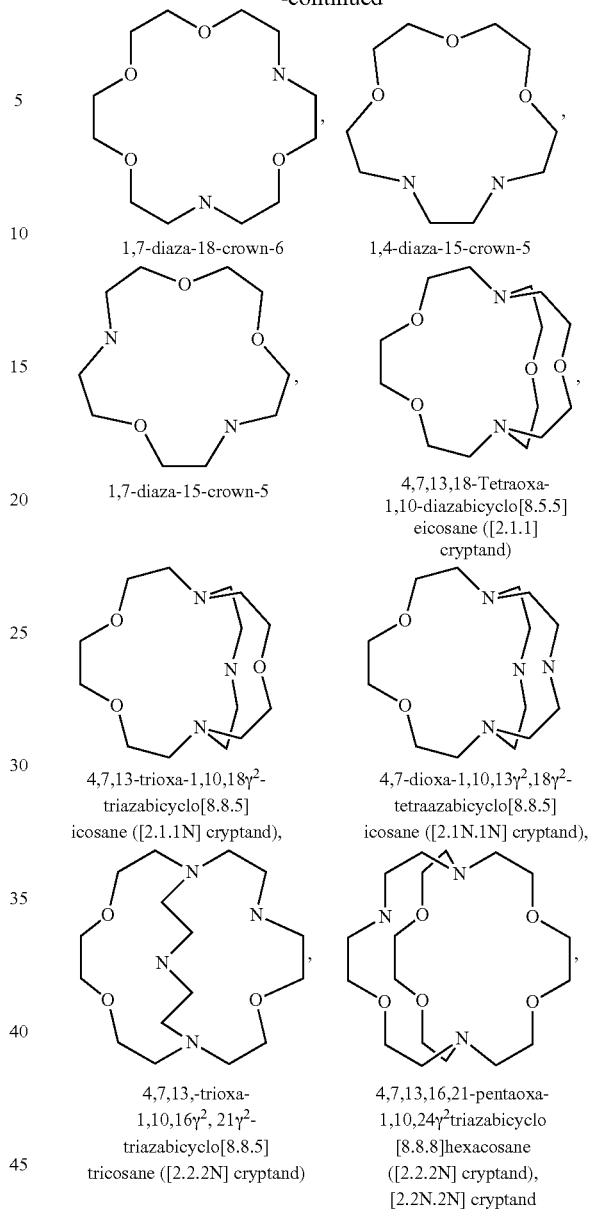

and combinations thereof.

9. The lithium ion battery as defined in claim 6 wherein:
the conductive high surface area carbon black filler is acetylene black; and
the lithium transition metal oxide-based active material is selected from the group consisting of $LiMn_2O_4$, $LiCoO_2$, $Li(Mn_{1.5}Ni_{0.5})O_2$, $LiFePO_4$, $Li_2FePO_4F$, $LiNi_{1-x}Co_{1-y}M_{x+y}O_2$ (M is a metal), $Li_xMn_{2-y}Al_yO_4$, and $LiV_2O_5$.

10. A method for making a positive electrode for a lithium ion battery, the method comprising:
functionalizing, through an ester, amide, ether, or isocyanate linkage, a reactive binder with a macrocycle to form a functionalized reactive binder, wherein the reactive binder is selected from the group consisting of: alginate, polyacrylic acid, polyundecylenic acid, and combinations thereof; and
mixing the functionalized reactive binder with a lithium transition metal oxide-based active material and a conductive high surface area carbon black filler.

11. The method as defined in claim 10 wherein the lithium transition metal oxide-based active material is present in an amount ranging from about 90% by weight to about 95% by weight, the conductive high surface area carbon black filler is present in an amount ranging from about 2% by weight to about 6% by weight, and the functionalized reactive binder is present in an amount ranging from about 3% by weight to about 6% by weight.

* * * * *